United States Patent [19]

Gross

[11] 4,194,117
[45] Mar. 18, 1980

[54] ARRANGEMENT FOR CONTINUOUSLY MEASURING THE RADIOACTIVITY OF SOLUTIONS OF MATTERS IN A HOMOGENEOUS MIXTURE WITH A LIQUID SCINTILLATOR

[76] Inventor: Valery N. Gross, ulitsa Poddubnogo 6, Alma-Ata, U.S.S.R.

[21] Appl. No.: 826,663

[22] Filed: Aug. 22, 1977

[51] Int. Cl.² ............................................. G01T 1/00
[52] U.S. Cl. ................................... 250/328; 250/364
[58] Field of Search .............. 250/328, 364, 432, 435

[56] References Cited

U.S. PATENT DOCUMENTS

| 3,682,598 | 8/1972 | Kaartinen | 250/364 X |
| 4,008,393 | 2/1977 | Rapkin | 250/328 |

*Primary Examiner*—Davis L. Willis
*Attorney, Agent, or Firm*—Steinberg and Blake

[57] ABSTRACT

An arrangement for continuously measuring the radioactivity of solutions of matters in a homogeneous mixture with a liquid scintillator, comprising two measuring chambers and a two-way tap valve connecting, in its first position, the first measuring chamber with the mixing device, and the second measuring chamber with a multi-channel pump, and in its second position, the first measuring chamber with the multi-channel pump, and the second measuring chamber with the mixing device.

1 Claim, 2 Drawing Figures

ARRANGEMENT FOR CONTINUOUSLY MEASURING THE RADIOACTIVITY OF SOLUTIONS OF MATTERS IN A HOMOGENEOUS MIXTURE WITH A LIQUID SCINTILLATOR

FIELD OF APPLICATIONS OF THE INVENTION

The invention relates to arrangements for measuring and monitoring radioactivity by scintillation methods, and, more particularly, it relates to arrangements for measuring continuously the radioactivity of solutions of matters in a homogenous mixture with a liquid scintillation.

The arrangement can be incorporated in liquid scintillation spectrometers for measuring and monitoring the radioactivity of continuous flows of liquids having radioactive substances dissolved therein, as part of biochemical, medico-biological and molecular-biological research, and also in production processes involving radiochemistry, in the monitoring systems of nuclear reactors, and elsewhere.

BACKGROUND OF THE INVENTION

The broad utilization of methods of radioactive indication in scientific research and by industries for monitoring various continuous analytical and production processes has put forward strict requirements concerning instruments for measuring the radioactivity of continuous liquid flows. The demand for such instruments has been increased by the development of such industries as nuclear power generation and radio-chemistry.

The hitherto known apparatus for continuous measurement of the radioactivity of solutions of matters, however, offer inadequately accurate response and are operable exclusively with relatively low flow rates of the solutions being monitored, which impairs the realization of the advantages offered by radioisotope-type detection of substances.

Improving the response and enhancing the dynamic characteristics of apparatus and arrangements for continuously measuring the radioactivity of solutions of matters is a prerequisite for substantially increasing the accuracy and speeding up the rate of continuous methods of analysis, e.g. liquid chromatography methods, and thus for speeding up the action and perfecting the response of monitoring systems of radiochemical production processes and nuclear power stations. An improvement of such arrangements will ultimately lead to fuller utilization of the methods of continuous analysis, offering as the latter are considerable advantages over intermittent processes, such as smaller labor consumption, economy of materials, on-time control of the process, minimum environment pollution, better working conditions, etc.

Known in the art is an arrangement for continuously measuring the radioactivity of solutions of matters in a homogeneous mixture with a liquid scintillator, comprising a system of conduits interconnecting a multi-channel pump, a mixing device for mixing a solution of a matter with a liquid scintillator, and a measuring chamber (see Journal of Chromatography, 1972, Vol. 72, No. 2, pp. 307–308).

In this arrangement the measuring chamber is a helix made of a tube constructed of polytetrafluoroethylene (such as that designated by the trademark Teflon). A probe mixture produced by blending homogeneously the water solution of a matter with a liquid scintillator is supplied from the mixing device into the chamber, and then from the latter into a drain receptacle.

To provide for adequately effective measurement of radioactivity and for obtaining a homogeneous probe mixture, there is used a scintillator containing toluene and Triton X-100, a trademark for polyethylene glycol alkyl aryl ether, in a 1:1 ratio, in case of which the maximum permissible value of water-to-scintillator ratio by volume is 1:3, while the volume of the measuring chamber, to ensure conditions of minimum agitation of the solution passing through the chamber, is 1.2 ml.

In a majority of cases this volume is insufficient to ensure high response and to attain statistically dependable outcome of measurements at high solution flow rates, even with aid of a costley scintillator containing Triton X-100. Should the volume of the chamber in the known construction be increased, either by increasing the diameter of the Teflon tube, or by increasing its length, the poor hydrodynamic properties of the apparatus would result in substantial stirring or agitation of the solution being analyzed, on account of turbulence. This becomes particularly apparent at high flow rates, which, in cases when the radioactivity of solutions of matters obtained at the outcome of a chromatography column is measured, considerably impairs the chromatograph.

It is an object of the present invention to provide an arrangement which would offer a high response at continous measurement of the radioactivity of solutions of matters.

It is another object of the present invention to improve the hydrodynamic characteristics of the arrangement.

It is still another object of the present invention to enhance the economy of the arrangement.

BRIEF DESCRIPTION OF THE INVENTION

The essence of the present invention resides in that an arrangement for continuously measuring the radioactivity of solutions of matters in a homogeneous mixture with a scintillator, comprising a system of conduits interconnecting a multi-channel pump, a mixing device for mixing a solution of a matter with a liquid scintillator, and a measuring chamber, in accordance with the invention, additionally comprises an auxiliary measuring chamber and an auxiliary conduit having one end communicating with the auxiliary chamber and the other end communicating with the respective channel of the multi-channel pump, and a two-way tap valve cut into the additional conduit and the conduit having one end connected with the mixing device and its other end connected to the main measuring chamber, the tap valve being adapted to connect, in its first position, the main chamber with the mixing device and the auxiliary chamber with the multichannel pump, and to connect, in its second position, the main chamber with the multi-channel pump and the auxiliary chamber with the mixing device.

The above-specified structure of the herein disclosed arrangement enables to step up the response at lease 5 times, as compared with the hitherto known arrangements, while using a scintillator which is at least but half as expensive.

Furthermore, the herein disclosed arrangement is capable of measuring flows of solutions, having the rate of flow several times higher than that handled by the hitherto known apparatus, with the stirring or agitation of the solution passing through the measuring chambers practically not increased.

BRIEF DESCRIPTION OF THE DRAWINGS

The present invention will be further described in connection with a preferred embodiment thereof, with reference being had to be accompanying drawings, wherein.

DETAILED DESCRIPTION OF THE INVENTION

Figures 1, 2:
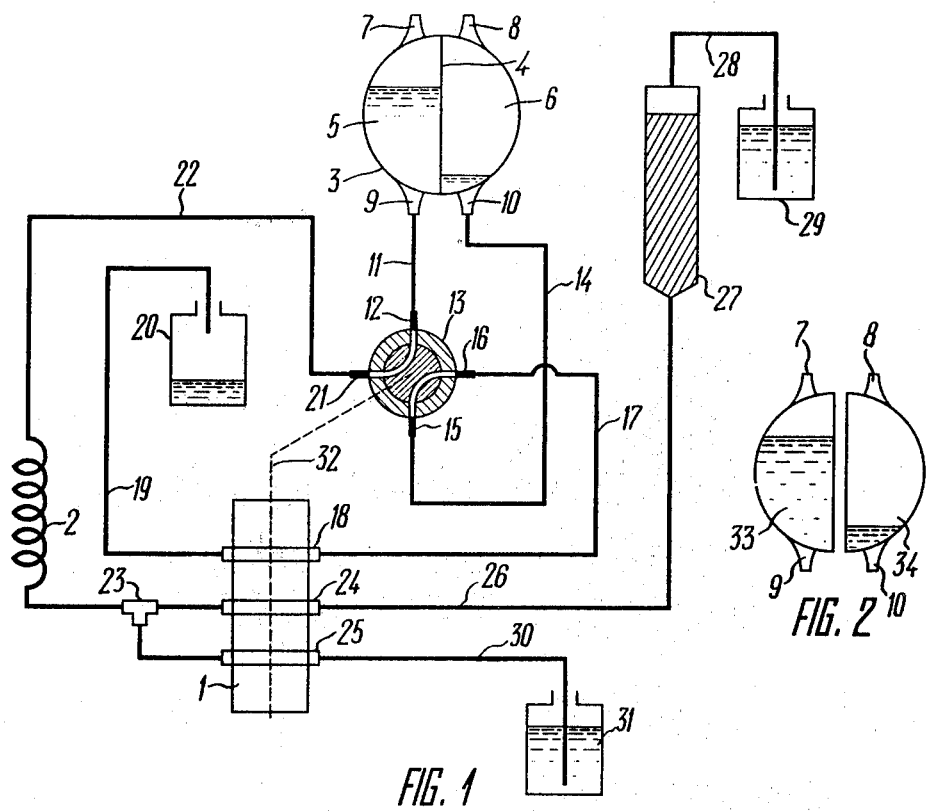
FIG. 1 illustrates an arrangement for continuously measuring the radioactivity of solutions of matters in a homogeneous mixture with a liquid scintillator, according to the invention.
FIG. 2 shows a measuring vessel with two chambers, in accordance with the invention.

Referring now to the appended drawings, the arrangement for continuously measuring the radioactivity of solutions of matters in a homogeneous mixture with a liquid scintillator includes a three-channel pump 1, a device 2 for mixing a solution of matter with a liquid scintillator made in the form of a helical tube, and a measuring vessel 3, interconnected with respective lines or conduits.

The measuring chamber 3 comprises a cylinder made of glass with a low potassium content. The vessel 3 has a partition 4 welded thereinto, diametrically of the base thereof, the partition 4 being made of the same glass grade and sealingly dividing the vessel 3 into two measuring chamber 5 and 6 of the same volume. The chambers 5, 6 have at the top portion thereof respective connections 7, 8, and at the bottom portion thereof—connections 9 and 10. The chamber 5 communicates via the connection 9 and a conduit 11 with the connection 12 of a two-way tap valve 13, while the chamber 6 is connected via the connection 10 and a conduit 14 to the connection 15 of the same two-way tap valve 13. The connection 16 of the two-way tap valve 13 communicates via a conduit 17, through the channel 18 of the three-channel pump 1 and through a conduit 19 with a receptacle 20 whereinto a probe is drained, following a measurement. The connection 21 of the tap valve 13 is connected via a conduit 22, through the mixing device 2, to a Tee-piece 23 connected with the channels 24 and 25 of the pump 1. The total displacement of the channels 24 and 25 equals the displacement of the channel 18. The channel 24 communicates via a conduit 26 with the bottom portion of a chromatography column 27 of which the top portion communicates via a conduit 28 with a container 29 with a supply of a solution fed into the column 27. The channel 25 communicates via a conduit 30 with a supply vessel 31 for a scintillator.

A dash line in the appended drawing illustrates an operative timing connection between the pump 1 and the two-way tap valve 13.

FIG. 2 of the appended drawings illustrates a modification of the measuring vessel, wherein the chambers 33 and 34 are defined by respective independent semi-cylinders.

The herein disclosed arrangement operates, as follows.

With the two-way tap valve 13 in the position illustrated in FIG. 1, the solution to be analyzed is fed from the chromatography column 27 by the channel 24 of the pump 1 via the conduit 26, through the Tee-piece 23 into the mixing device 2. Simultaneously, the scintillator if fed into the same mixing device 2 by the channel 25 of the pump 1 from the supply vessel 31.

Produced within the mixing device 2 is a homogeneous probe mixture which is supplied via the conduit 22, the connections 21 and 12 of the two-way tap valve 13, the conduit 11 and the connection 9 into the chamber 5 of the measuring vessel 3. Light splashes caused by the transfer of energy by B-particles of the traced molecules of the matter, contained in the solution obtained at the outlet of the chromatography column, to the molecules of the scintillator are registered by appropriate photocells (not shown) of a scintillation liquid spectrometer, and the radioactivity of the matter being monitored is determined by the number of such splashes per unit of time.

With the chamber 5 having been filled with a predetermined amount of the probe mixture, the two-way tap valve 13 is switched over, whereby communication is established, respectively, between the connections 12 and 16, 15 and 21.

Consequently, the probe mixture from the conduit 22 flows via the connections 21 and 15 into the conduit 14, and through the connection 10 into the chamber 6 of the measuring vessel 3. Simultaneously, from the chamber 5 the mixture is drawn by the channel 18 of the pump 1 through the conduit 11, the connections 12 and 16 of the two-way tap valve, 13, via the conduit 19 and through the conduit 19 into the receptacle 20, at a rate equalling that of the feeding of the mixture into the chamber 6. With the chamber 6 having been filled with the predetermined amount of the probe mixture, the two-way tap valve 13 is switched over, and the above-described process is repeated.

With the rates of the flows of the probe mixture being fed into and drawn from the measuring vessel 3 equalling each other, the monitored volume of the probe mixture in the vessel 3 at any given moment of time has a constant value, while the continuous supply of the probe mixture into either one of the chambers 5 and 6 of the vessel 3 enables to perform permanent and continuous registration of the radioactivity of the solution being monitored and analyzed.

Stirring or agitation of the probe mixture within the confines of a single chamber 5, 6 of the measuring vessel 3 has no influence on the measurement of the successive volume of the mixture, since the mixture fed into either chamber 5 (6) is completely isolated from the mixture fed into the other chamber 6 (5). Therefore, the volume of the measuring vessel 3, and , consequently, the probe volume of the mixture under measurement may be increased without affecting the obtained chromatogrphic separation of the matter, in which way the main object of the invention is attained.

An arrangement for continuously measuring the radioactivity of solutions of matters in a homogeneous mixture with a liquid scintillator, constructed in accordance with the present invention, offers a high response, economical operation and is suitable for monitoring the radioactivity of solutions flowing at high rates, which permits its use in experimental and production processes of continuous separation of isotopes and traced matters, as well as in safety and monitoring systems of radiochemical productions and nuclear power stations.

What is claimed is:

1. An arrangement for continuously measuring the radioactivity of solutions of matters in a homogeneous mixture with a liquid scintillator, comprising: a multichannel pump for feeding the solution of a matter, the liquid scintillator and their mixture, a device for mixing the solution of a matter with the liquid scintillator and for obtaining a homogeneous mixture thereof: a first measuring chamber; a second measuring chamber; a system of conduits: a two-way tap valve having two operating positions; said two-way tap valve serving, when in the first position thereof, to establish communication between said first measuring chamber and said mixing device, and between said second measuring chamber and said multi-channel pump, and also serving, when in the second position thereof, to establish communication between said first measuring chamber and said multi-channel pump, and between said second measuring chamber and said mixing device.

* * * * *